US011530131B1

(12) United States Patent
Tora et al.

(10) Patent No.: US 11,530,131 B1
(45) Date of Patent: Dec. 20, 2022

(54) METHODS AND SYSTEMS OF SUB-DEW POINT SULFUR RECOVERY WITH INTERSTAGE MEMBRANE UNITS

(71) Applicant: Saudi Arabian Oil Company, Dhahran (SA)

(72) Inventors: Eman Abdelhakim Aly Mohamed Tora, Dhahran (SA); John Patrick O'Connell, Dhahran (SA); Ismail Abdullah Alami, Dhahran (SA); Faisal Al-Otaibi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/527,753

(22) Filed: Nov. 16, 2021

(51) Int. Cl.
*C01B 17/04* (2006.01)

(52) U.S. Cl.
CPC ...... *C01B 17/0439* (2013.01); *C01B 17/0408* (2013.01); *C01B 17/0434* (2013.01); *C01B 17/0447* (2013.01); *C01B 2210/001* (2013.01); *C01B 2210/0004* (2013.01); *C01B 2210/0062* (2013.01)

(58) Field of Classification Search
CPC ............ C01B 17/0439; C01B 17/0408; C01B 17/0434; C01B 17/0447; C01B 2210/0062; C01B 2210/0004; C01B 2210/001
See application file for complete search history.

(56) References Cited

U.S. PATENT DOCUMENTS

| | | | |
|---|---|---|---|
| 2,594,149 A * | 4/1952 | Gamson | C01B 17/04 423/574.1 |
| 2,889,207 A | 6/1959 | Theodore | |
| 3,702,884 A | 11/1972 | Hunt et al. | |
| 3,749,762 A | 7/1973 | Montgomery | |
| 3,758,676 A | 9/1973 | Goddin et al. | |
| 4,035,474 A | 7/1977 | Kunkel et al. | |
| 4,071,607 A | 1/1978 | Hiller | |
| 4,311,683 A | 1/1982 | Hass et al. | |
| 4,391,791 A * | 7/1983 | Palm | C01B 17/0447 422/612 |
| 4,430,317 A * | 2/1984 | Reed | C01B 17/0456 422/177 |
| 4,482,532 A | 11/1984 | Cabanaw et al. | |
| 4,508,698 A * | 4/1985 | Reed | C01B 17/0439 423/576 |
| 4,988,494 A | 1/1991 | Lagas et al. | |
| 5,015,459 A | 5/1991 | Pendergraft | |
| 5,015,460 A | 5/1991 | Pendergraft | |
| 8,551,199 B2 | 10/2013 | Thacker et al. | |
| 9,313,829 B2 | 4/2016 | Hodson | |
| 9,943,802 B1 | 4/2018 | Ballaguet et al. | |
| 10,005,666 B2 | 6/2018 | Ercan et al. | |
| 10,106,411 B2 | 10/2018 | Ballaguet et al. | |
| 2005/0180914 A1 | 8/2005 | Keller et al. | |
| 2013/0123559 A1 | 5/2013 | Milam et al. | |
| 2015/0298972 A1 | 10/2015 | Ballaguet et al. | |
| 2017/0044015 A1 | 2/2017 | Rameshni et al. | |
| 2017/0137288 A1 | 5/2017 | Ballaguet et al. | |
| 2017/0190574 A1 * | 7/2017 | Ercan | B01D 53/8615 |

FOREIGN PATENT DOCUMENTS

| | | |
|---|---|---|
| CN | 102781823 B | 11/2012 |
| CN | 102989268 A | 3/2013 |
| CN | 206823499 U | 1/2018 |
| DE | 10332794 A1 | 2/2005 |
| EP | 0094751 A1 | 11/1983 |
| EP | 0132996 A1 | 2/1985 |
| EP | 0560039 A1 | 9/1993 |
| WO | 92017401 A1 | 10/1992 |
| WO | 97000392 A1 | 1/1997 |
| WO | 97003920 A1 | 2/1997 |
| WO | 2006113935 A2 | 10/2006 |

OTHER PUBLICATIONS

Espacenet English Abstract of China patent application No. CN102781823, published on May 20, 2015, 1 page.
Espacenet English Abstract of China patent application No. CN102989268, published on Mar. 27, 2013, 1 page.
Espacenet English Abstract of China patent application No. CN206823499, published on Jan. 2, 2018, 1 page.
Espacenet English Abstract of EP0560039A1, published Sep. 15, 1993, 1 page.
Espacenet English Abstract of German patent application No. DE10332794, published on Feb. 10, 2005, 1 page.

* cited by examiner

*Primary Examiner* — Timothy C Vanoy
(74) *Attorney, Agent, or Firm* — Bracewell LLP; Constance G. Rhebergen; Eleanor L. Tyson (57) ABSTRACT

Provided here are methods and systems to recover greater than 99.9% of sulfur from natural gas and from other processed gases containing hydrogen sulfide derived from refining crude oil and other industrial processes. The method and system involves a sub-dew point reactor unit with separation units for water removal.

19 Claims, 4 Drawing Sheets

METHODS AND SYSTEMS OF SUB-DEW POINT SULFUR RECOVERY WITH INTERSTAGE MEMBRANE UNITS

FIELD

This disclosure relates to systems and methods generally directed to sulfur recovery.

BACKGROUND

The sulfur recovery industry has been using the modified Claus reaction as the basis for recovering elemental sulfur from hydrogen sulfide ($H_2S$). A Claus process achieves approximately 95 percent (%) to 98% conversion of the $H_2S$ in the acid gas feed streams to elemental sulfur. The conventional Claus process includes a thermal combustion stage and a catalytic reaction stage. In terms of equipment, the Claus plant (Claus unit) includes a thermal reactor and two or three catalytic reactors (Claus converters). Typical sulfur recovery efficiencies for Claus plants with two Claus converters (reactors) is between 90 and 97%, and for a Claus plant with three converters between 95 and 98%. In a further effort to improve Sulfur Recovery Unit (SRU) efficiency, Claus reaction sub-dew point technology was introduced to allow sulfur vapor to condense within the catalytic beds. This technology increased the overall recovery efficiency capability of the sulfur recovery unit to 99% to 99.5%. Due to the negative impact of acid rain in the environment from high levels of $SO_2$ emitted to the atmosphere from the effluent of SRUs, the industry began developing Tail Gas Treatment (TGT) technologies that are placed immediately downstream of the Claus plant to further improve the recovery efficiency to 99.9%. The most common combination of Claus plant and TGT for achieving 99.9% recovery is a two-stage Claus unit followed by a reduction/absorption amine-based TGT. This technology requires the reduction and hydrolysis of sulfur-containing compounds back to the form of $H_2S$ to allow for subsequent absorption in an amine contactor. The $H_2S$ that is absorbed into the amine is then regenerated and recycled back to the front of the Claus plant for reprocessing. While this is a robust technology, the capital costs (CAPEX) and operating costs (OPEX) are considerable. There is increasing demand to achieve higher sulfur removal and recovery efficiency due to tight emissions regulations. Recent environmental regulations regarding sulfur oxides (SOx) emissions place a stringent requirement on commercial sulfur recovery and accordingly, most countries require sulfur recovery efficiency in the range of 98.5% to 99.9% or higher.

SUMMARY

Several disadvantages were recognized and various embodiments of this disclosure were developed to address these shortcomings in the field. Certain embodiments disclosed and described here include methods and systems to recover greater than 99.9% of sulfur from natural gas and from the by-product gases containing hydrogen sulfide derived from refining crude oil and other industrial processes. In at least one embodiment, the overall sulfur recovery efficiency is greater than 99.9% and alternately between 99.9% and 99.99%. An embodiment of the system involves using a modified-Claus thermal stage, one Claus catalytic reactor, and either two or three sub-dew point reactors configured with membrane units for water removal.

In a first aspect, a method to recover sulfur from an acid gas stream is provided. The method includes the steps of supplying the acid gas stream to a reaction furnace to produce a reaction product containing elemental sulfur, hydrogen sulfide, sulfur dioxide, and water vapor, introducing the reaction product to a waste heat boiler to produce a boiler outlet, the waste heat boiler configured to reduce a temperature of the reaction product, supplying the boiler outlet to a furnace condenser to produce a liquid sulfur stream and a cooled outlet, introducing the cooled outlet to a reheater to produce a hot stream, supplying the hot stream to a Claus catalytic unit to produce a catalytic outlet stream, and cycling three reactors arranged in series between a first position, a second position, and a third position, where each reactor includes an alumina catalyst, where a cycling reactor in the first position operates in a regeneration mode, where the reactors in the second position and the third position operate in an adsorption mode. The regeneration mode includes a heating step, a re-vaporization step, and a cooling step, the heating step includes the steps of routing the catalytic outlet stream through a cycling valve to produce a unit feed stream, where the unit feed stream is at a temperature between 340° C. and 360° C., introducing the unit feed to the cycling reactor in the first position, where the cycling reactor in the first position includes liquid sulfur in pores of the alumina catalyst, and increasing the temperature in the cycling reactor in the first position to greater than the dew point of sulfur. The re-vaporization step includes the steps of vaporizing the liquid sulfur in the cycling reactor in the first position to produce sulfur vapor, collecting the sulfur vapor to produce a first reactor outlet, reducing a temperature of the first reactor outlet in a reactor condenser to produce a first sulfur product and a cooled reactor outlet, where the temperature in the reactor condenser is less than the dew point of sulfur such that the first sulfur product includes liquid sulfur, and separating water vapor from the first cooled reactor outlet in a first separation unit to produce a first water stream and a first dehydrated stream, where the first separation unit is selected from the group consisting of molecular separation devices, membrane separators, nanofiltration units, and combinations of the same. The re-vaporization step continues for a re-vaporization time. The cooling step includes the steps of routing the catalytic outlet stream to a catalytic unit condenser after the re-vaporization time expires, reducing a temperature of the catalytic outlet stream in the catalytic unit condenser to produce a liquid sulfur and cooled catalytic outlet, where the cooled catalytic outlet is at a temperature less than the dew point of sulfur, routing the cooled catalytic outlet through the cycling valve to produce the unit feed stream, introducing the unit feed to the cycling reactor in the first position, and reducing the temperature in the cycling reactor in the first position to less than the dew point of sulfur. The adsorption mode includes the steps of introducing the first dehydrated stream to the cycling reactor in the second position, operating the cycling reactor in the second position such that hydrogen sulfide is converted to liquid sulfur such that the liquid sulfur fills pores in the alumina catalyst, collecting unconverted gases in a second reactor outlet, reducing a temperature of the second reactor outlet in a second reactor condenser to produce a second cooled reactor outlet, separating water vapor from the second cooled reactor outlet in a second separation unit to produce a second water stream and a second dehydrated stream, where the second separation unit is selected from the group consisting of molecular separation devices, membrane separators, nanofiltration units, and combinations of the same, introducing the second dehydrated stream to the cycling reactor in the third position, operating the cycling reactor in the third position such that hydrogen sulfide is converted to liquid sulfur such that the liquid sulfur fills the pores in the alumina catalyst, collecting unconverted gases in a third reactor outlet, reducing a temperature of the third reactor outlet in a third reactor condenser to produce a third cooled reactor outlet, and separating water vapor from the third cooled reactor outlet in a third separation unit to produce a third water stream and a third dehydrated stream, where the third separation unit is selected from the group consisting of molecular separation devices, membrane separators, nanofiltration units, and combinations of the same. The cycling reactor in the third position is cycled to the first position when an amount of liquid sulfur in the pores of the alumina catalyst is one-third of the weight of the alumina catalyst, such that the cycling reactor in the second position becomes the cycling reactor in the third position, and the cycling reactor in the first reactor becomes the cycling reactor in the second position. The switching valves upstream of each reactor route the unit feed stream. The bypass valves downstream of each separation unit route the dehydrated stream to the subsequent reactor. Removing water vapor from the cooled reactor outlets increases the conversion of hydrogen sulfide to sulfur.

In certain aspects, a temperature of the hot stream is between 200° C. and 380° C. In certain aspects, the Claus catalytic unit includes a catalyst, wherein the catalyst is selected from the group consisting of titanium dioxide, alumina, or combinations of the same. In certain aspects, a temperature of the catalytic outlet stream is between 340° C. and 360° C. In certain aspects, the amount of water vapor removed in each separation unit is between 40 vol % and 100 vol % of the water vapor present in each cooled reactor outlet. In certain aspects, the temperature of the first reactor outlet is between 180° C. and 360° C., the temperature of the second reactor outlet is between 130° C. and 190° C., and the temperature of the third reactor outlet is between 120° C. and 130° C. In certain aspects, the method further includes the step of introducing the third dehydrated stream to a thermal oxidizer. In certain aspects, the overall sulfur recovery efficiency is greater than 99.9%. In certain aspects, the method further includes the steps of introducing a hot feed from the waste heat boiler to the reheater where the waste heat boiler is a two-pass waste heat boiler and the hot feed is from a first pass of the two-pass waste heat boiler, and mixing the hot feed and the cooled outlet in the reheater to produce the hot stream.

In a second aspect, a system to recover sulfur from an acid gas stream is provided. The system includes a reaction furnace configured to produce a reaction product containing elemental sulfur, hydrogen sulfide, sulfur dioxide, and water vapor, a waste heat boiler fluidly connected to the reaction furnace, the waste heat boiler configured to remove heat from the reaction product to produce a boiler outlet, a furnace condenser fluidly connected to the waste heat boiler, the furnace condenser configured to process the boiler outlet to produce a liquid sulfur stream and a cooled outlet, a reheater fluidly connected to the furnace condenser, the reheater configured to increase the temperature of the cooled outlet to produce a hot stream, a Claus catalytic unit fluidly connected to the reheater, the Claus catalytic unit configured to process the hot stream to produce a catalytic outlet stream, a catalytic unit condenser fluidly connected to the Claus catalytic unit, the catalytic unit condenser configured to reduce a temperature of the catalytic outlet stream to produce a cooled catalytic outlet, a cycling valve fluidly connected to the Claus catalytic unit and the catalytic unit condenser, the cycling valve configured to bypass the catalytic unit condenser such that the catalytic outlet stream is routed directly to a sub-dew point unit as a unit feed stream, and the sub-dew point unit fluidly connected to the cycling valve, the sub-dew point unit configured to recover sulfur. The sub-dew point unit includes three reactors arranged in series, each reactor includes an alumina catalyst, each reactor configured to operate below the dew point of sulfur to produce liquid sulfur, three sulfur condensers, each sulfur condenser fluidly connected to one reactor, each sulfur condenser configured to reduce a temperature of reactor outlet to produce a sulfur product and a cooled reactor outlet, three separation units, each separation unit fluidly connected to one sulfur condenser, each separation unit is selected from the group consisting of molecular separation devices, membrane separators, nanofiltration units, and combinations of the same, each separation unit configured to remove water vapor from the cooled reactor outlet to produce a water stream and a dehydrated stream, three switching valves, each switching valve fluidly connected to the cycling valve and to one reactor, the switching valves configured to route the unit feed stream to the reactor in a first position, and three bypass valves, each bypass valve fluidly connected to one separation unit, the bypass valves configured to route each dehydrated stream to the subsequent reactor in series or to a thermal oxidizer.

In certain aspects, the cycling valve is a specialized fully steam-jacketed valve. In certain aspects, each bypass valve is a three-way specialized fully steam-jacketed valve. In certain aspects, the separation unit is a membrane separator that includes a membrane.

Numerous other aspects, features and benefits of the present disclosure may be made apparent from the following detailed description taken together with the drawing figures. The systems can include less components, more components, or different components depending on desired analysis goals.

BRIEF DESCRIPTION OF THE DRAWINGS

While the embodiments described here are susceptible to various modifications and alternative forms, specific embodiments are shown by way of example in the drawings and will be described in detail here. The drawings may not be to scale. The drawings and the detailed descriptions are not intended to limit the disclosure to the particular form disclosed, but, to the contrary, the intention is to cover all modifications, equivalents, and alternatives falling within the spirit and scope of the present disclosure as defined by the appended claims.

DETAILED DESCRIPTION

In the following description, numerous specific details are set forth in order to provide a thorough understanding of the various embodiments. In other instances, well-known processes and methods may not be described in particular detail in order not to unnecessarily obscure the embodiments described here. Additionally, illustrations of embodiments here may omit certain features or details in order to not obscure the embodiments described here. The description uses the phrases "in various embodiments," "in certain embodiment," or "an embodiment," which may each refer to one or more of the same or different embodiments. Furthermore, the terms "comprising," "including," "having," and the like, as used with respect to embodiments of the present disclosure, are synonymous.

Described here are embodiments for the conversion of hydrogen sulfide ($H_2S$) to elemental sulfur and subsequent recovery. At the boiling point of elemental sulfur and up to the regenerative temperature of 340° C. to 360° C., the vapor as well as the liquid can contain species with combinations of two, three, four, five, six, seven, and eight atoms. Embodiments described here for a commercial sulfur recovery unit are capable of recovering greater than 99.9 percent (%) of the sulfur contained in the gas streams fed to a sulfur recovery unit in a refinery or sour gas plant facility without the need for a reduction/absorption amine-based TGT unit. These embodiments include an overall sulfur recovery efficiency of greater than 99.9% by taking advantage of the sub-dew point technology. In conventional Claus reactors and condensers, a measureable amount of sulfur vapor is in equilibrium that does not allow for greater than 99.9% recovery efficiencies to be obtained. Sub-dew point technology will allow, in the sub-dew point reactors, both liquid and vapor sulfur to be captured and subsequently regenerated and recovered; thus, allowing for very high overall recovery efficiencies.

An embodiment of a sulfur recovery system includes a modified Claus thermal reactor, a Claus reactor and three sub-dewpoint reactors. Each sub-dew point reactor is configured with a dedicated condenser followed by a membrane separation unit. The sulfur recovery system can also include a waste heat boiler and condenser downstream of the modified Claus thermal reactor. The sulfur recovery system can further include a condenser downstream of the Claus reactor.

The configuration of the sulfur recovery system allows for an overall sulfur recovery efficiency of greater than 99.9% to be achieved without the need for a reduction/absorption amine-based TGT. The membrane separation units containing hydrophilic membranes can be placed immediately downstream of each sub-dew point condenser and can remove water vapor from the process gas stream.

This configuration allows for the removal of process water via the membrane separation units and Claus reaction products, such as liquid sulfur via condensers. This removal of products drives the Claus reaction equilibrium further to the right (the products side), which results in higher recovery efficiencies. The water that is removed from this process has negligible levels of sulfur compounds and can be processed in a wastewater unit, sour water stripper unit, or thermal oxidizer, or be further treated and recycled for use in other units, for example as boiler feedwater. Embodiments disclosed here allow for high overall recovery efficiencies and cost-effectiveness as compared to the traditional Claus/TGT configuration. Moreover, the operation of the unit consumes less operational and equipment resources than the Claus/TGT combination.

As used throughout, "elemental sulfur" refers to all forms of sulfur, $S_2$ through $S_8$, that are recoverable as liquid sulfur, with liquid sulfur being made up mostly of $S_8$ atoms.

Figure 1A:
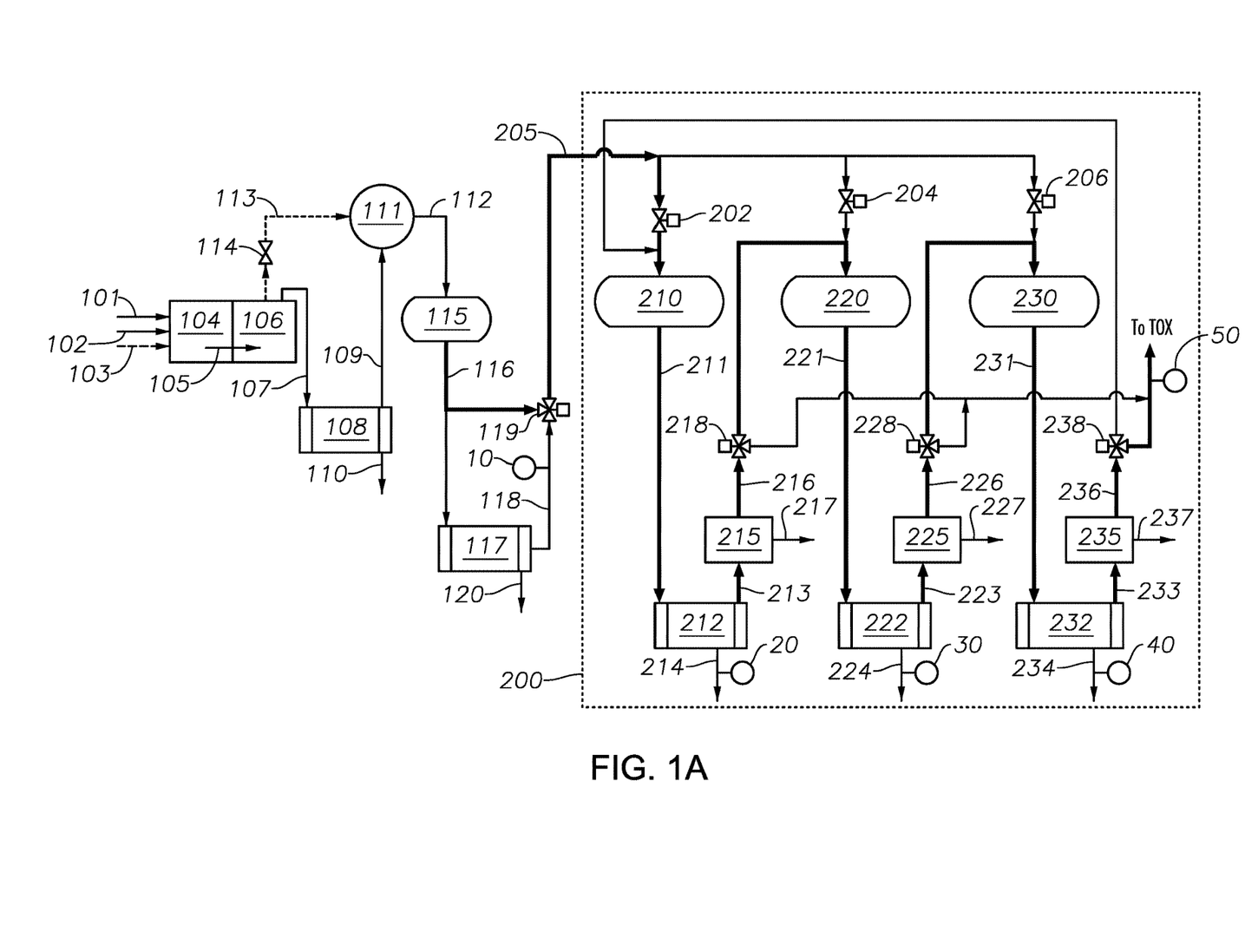
FIG. 1A is a diagrammatic representation of the sulfur recovery system including the membrane units, according to an embodiment.
Figure 1B:
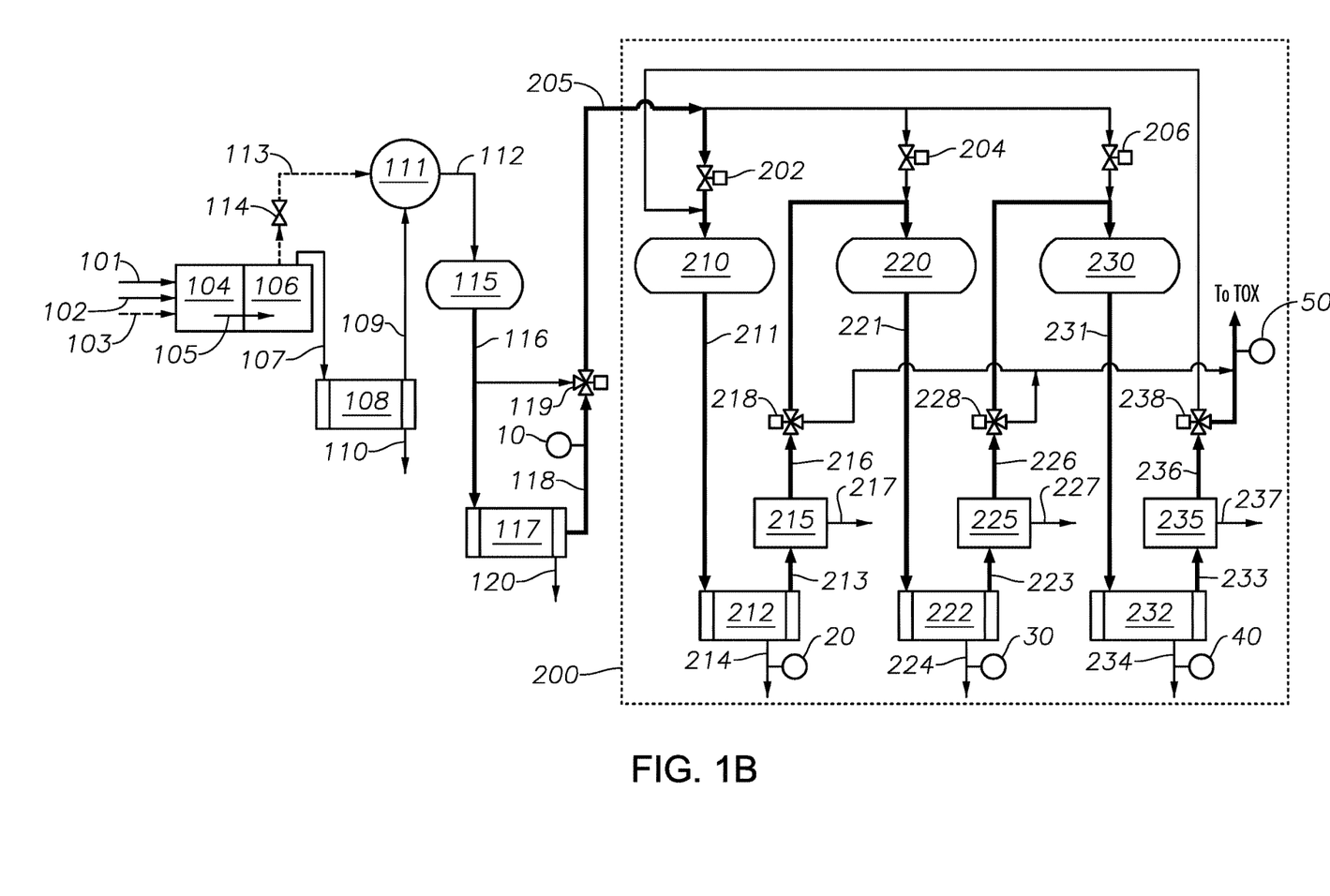
FIG. 1B is a diagrammatic representation of the sulfur recovery system including the membrane units, according to an embodiment.

An embodiment of the sulfur recovery system can be understood with reference to FIG. 1A and FIG. 1B. Acid gas stream 101, combustion air 102, and optionally fuel gas stream 103 can be supplied to reaction furnace 104. Acid gas stream 101, combustion air 102, and optionally fuel gas stream 103 can each be pre-heated in a separate preheater (not shown) upstream of reaction furnace 104.

Acid gas stream 101 can be any source of an acid gas. Sources of acid gas stream 101 can include sour gas plants, refinery streams, and combinations of the same. Acid gas stream 101 can include hydrogen sulfide ($H_2S$) and contaminants. The contaminants in acid gas stream 101 can include hydrocarbons, sulfur-containing contaminants, ammonia, and combinations of the same. The hydrocarbons can include light hydrocarbons, heavy hydrocarbons, benzene, toluene, ethyl benzene, xylenes, methanol, and combinations of the same. Sulfur-containing contaminants can include carbonyl sulfide (COS), carbon disulfide ($CS_2$), and combinations of the same.

Combustion air 102 can be from any source of an oxygen-containing stream. Combustion air 102 can include air, oxygen, and oxygen-enriched air. Combustion air 102 can include an air control scheme (not shown) to control the flow rate of combustion air 102. The air control scheme can include a main air valve and ratio controller (based on the flow rate of acid gas stream 101) and a trim air valve and a feedback controller that takes its signal from a tail gas analyzer that analyzes the $H_2S$ and $SO_2$ concentrations.

Fuel gas stream 103 can be any source of fuel gas capable of being co-fired in reaction furnace 104. Fuel gas stream 103 can include natural gas. Fuel gas stream 103 can optionally be supplied to reaction furnace 104 if needed to be co-fired in the burner section of reaction furnace 104 to maintain the temperature in the reaction furnace section.

Reaction furnace 104 can be any type of Claus thermal stage capable of enabling the overall Claus reaction. Reaction furnace 104 can include a burner section and a reaction furnace section.

The overall Claus reaction is as follows:

$$2H_2S+O_2 \rightarrow 2S+2H_2O \text{ Reaction} \quad (1)$$

The overall Claus reaction in reaction furnace 104 can result in the conversion of approximately 50% to 75% of all sulfur-bearing compounds entering reaction furnace 104 into elemental sulfur. Reaction furnace 104 can ensure that all contaminants in the acid gas stream are destroyed. Failure to properly destroy the contaminants in reaction furnace 104 can negatively impact the purity of the sulfur product and can cause problems in the downstream units, and can also result in these contaminants being emitted to the atmosphere. The minimum temperature in reaction furnace 104 to ensure proper destruction of the contaminant in acid gas stream 101 can depend on the presence of ammonia in acid gas stream 101. In embodiments where acid gas stream 101 is in the absence of ammonia, reaction furnace 104 can be designed to operate at a minimum temperature of 1050 degrees centigrade (° C.) to ensure proper destruction of the contaminants. In embodiments where acid gas stream 101 contains ammonia, reaction furnace 104 can be designed to operate at a minimum temperature of 1250° C. to ensure proper destruction of the contaminants. To achieve the operating temperatures in reaction furnace 104, a combination of one or more approaches, including acid gas stream preheating, combustion air preheating, oxygen enrichment, and fuel gas co-firing, can be implemented. In certain embodiments, the level of $H_2S$ in acid gas stream 101 can determine the one or more approaches taken to maintain the reaction furnace at the appropriate operating temperatures.

Reaction furnace 104 can produce reaction product 105. Reaction product 105 can include elemental sulfur, hydrogen sulfide, sulfur dioxide, sulfur-containing contaminants, water vapor, and combinations of the same. Sulfur-containing contaminants can include carbonyl sulfide (COS), carbon disulfide ($CS_2$), and combinations of the same. The sulfur-containing contaminants can be formed via unwanted side reactions. Reaction product 105 can be introduced to waste heat boiler 106.

Waste heat boiler 106 is fluidly connected to reaction furnace 104. In at least one embodiment, waste heat boiler 106 is physically and fluidly connected to reaction furnace 104. Waste heat boiler 106 can be any type of boiler capable of reclaiming heat generated by the Claus reaction. In at least one embodiment, waste heat boiler 106 is a shell-and-tube heat exchanger. In at least one embodiment, waste heat boiler 106 is a two-pass boiler. The temperature of reaction product 105 can be reduced in waste heat boiler 106 to produce boiler outlet 107. The temperature of boiler outlet 107 can be 300° C. When a two-pass boiler is used as waste heat boiler 106, the temperature after the first pass can be between 500° C. and 600° C. and the temperature after the second pass can be 300° C. Heat recovered in waste heat boiler 106 can be transferred to a water stream to produce saturated steam. In at least one embodiment, heat recovered in waste heat boiler 106 can be transferred to a water stream to produce 42 bar steam. Boiler outlet 107 from waste heat boiler 106 can be supplied to furnace condenser 108.

Furnace condenser 108 is fluidly connected to waste heat boiler 106. Furnace condenser 108 can be any type of heat exchanger capable of condensing elemental sulfur from a vapor phase to a liquid phase and can be designed to reach a temperature such that most sulfur in the inlet stream is removed. In at least one embodiment, furnace condenser 108 is a shell-and-tube heat exchanger. The temperature of boiler outlet 107 can be reduced in furnace condenser 108 to produce cooled outlet 109. The temperature of cooled outlet 109 can be between 120° C. and 200° C. and alternately between 150° C. and 175° C. Sulfur present in boiler outlet 107 can condense in furnace condenser 108 and be removed from the process in liquid sulfur stream 110. Liquid sulfur stream 110 can include liquid sulfur. Heat recovered in furnace condenser 108 can be transferred to a water stream to produce saturated stream. In at least one embodiment, heat recovered in furnace condenser 108 can be transferred to a water stream to produce 3.5 bar saturated steam. First cooled stream 109 can be introduced to reheater 111.

The temperature of cooled outlet 109 can be increased in reheater 111 to produce hot stream 112. Reheater 111 can be any type of heat exchanger capable of heating a gas stream. Reheater 111 can include a physical heater or a hot gas bypass reheater. Examples of physical heaters include shell-and-tube exchangers, cross-exchangers, direct fired reheaters, indirect fired reheaters, and indirect steam reheaters. In at least one embodiment, as shown in FIG. 1A, reheater 111 is a hot gas bypass reheater, where hot feed 113 is mixed with first cooled stream 109 to produce hot stream 112. Hot feed 113 can be a slipstream from the first pass of waste heat boiler 106, when waste heat boiler 106 is a two-pass waste heat boiler, at a temperature between about 500° C.-600° C. The flow rate of hot feed 113 can be controlled via boiler valve 114. In at least one embodiment, boiler valve 114 can be a specialized refactory-lined fully steam-jacketed valve. The use of a refactory-lined fully steam-jacked valve allows for reliable and accurate temperature control to Claus catalytic unit 115 by precisely adjusting the flow rate of hot feed 113. In at least one embodiment, reheater 111 is only a hot gas bypass reheater and is in the absence of a physical reheater.

Reheater 111 can increase the temperature of first cooled stream 109 from furnace condenser 108 outlet temperature to the temperature at which the Claus catalytic reaction in Claus catalytic unit 115 occur. Reheater 111 is operated under conditions to ensure that the elemental sulfur produced in the Claus catalytic unit 115 remains in the vapor phase. The temperature of hot stream 112 can be the range between 200° C. and 380° C. The temperature of hot stream 112 can be designed based on the overall system.

Hot stream 112 can be introduced to Claus catalytic unit 115. Claus catalytic unit can be any type of catalytic reactor. In Claus catalytic unit 115, the hydrogen sulfide and sulfur dioxide in hot stream 112 are converted to elemental sulfur and water according to the catalytic Claus reaction:

$$2H_2S+SO_2 \rightarrow 3S+2H_2O \qquad \text{Reaction (2).}$$

Claus catalytic unit 115 can contain a catalyst bed. Both the catalyst selected and the temperature in Claus catalytic unit 115 can impact the ability to hydrolyze the sulfur-containing contaminants. The catalyst in the catalyst bed of the catalytic reactor can be any catalyst that catalyzes reaction (2). The catalyst can include titanium dioxide or a combination of titanium dioxide and alumina. In at least one embodiment, the catalyst contains titania in the range from 50 volume percent (vol %) and 70 vol % and alumina in the range from 30 vol % to 50 vol %.

The temperature in Claus catalytic unit 115 can be in the range between 340° C. and 360° C. Operating Claus catalytic unit 115 in this temperature range can maintain the elemental sulfur in the vapor phase and can ensure optimal hydrolysis of the sulfur-containing contaminants. By maintaining at least 50 vol % titania in the catalyst and a temperature between 340° C. and 360° C. in Claus catalytic unit 115, greater than 99 weight % (wt %) of the sulfur-containing contaminants formed in reaction furnace 104 can be hydrolyzed to $H_2S$. Hydrolyzing greater than 99 wt % of the sulfur-containing contaminants in Claus catalytic unit 115 enables the system and method to recover sulfur from an acid gas stream to achieve an overall sulfur recovery efficiency of greater than 99.9%. The reaction products formed in Claus catalytic unit 115 can exit Claus catalytic unit 115 as catalytic outlet stream 116. Catalytic outlet stream 116 can include elemental sulfur, $H_2S$, $H_2O$, $SO_2$, sulfur-containing contaminants, and combinations of the same. Catalytic outlet stream 116 can be fed to catalytic unit condenser 117 or to sub-dew point unit 200.

Figure 2:
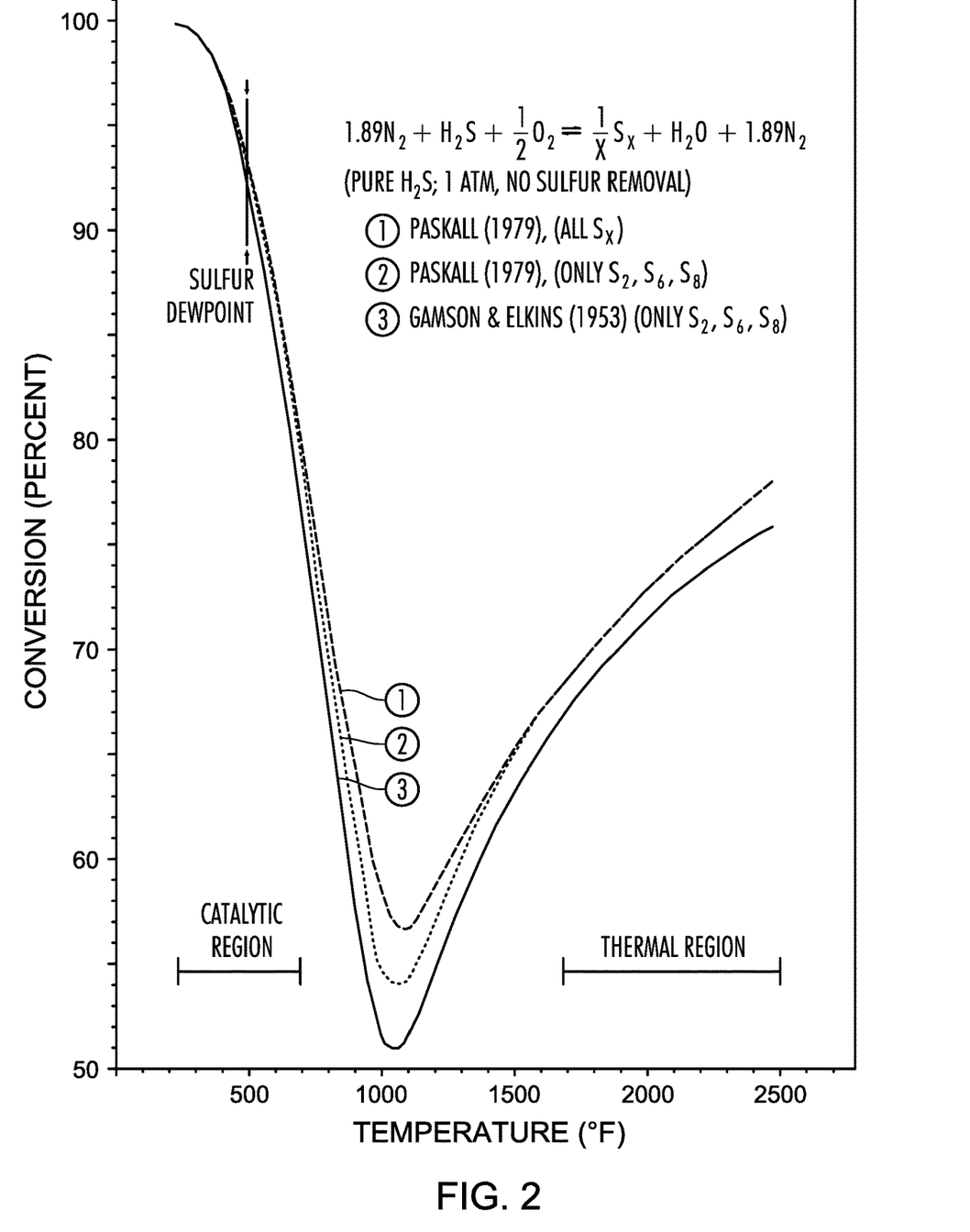
FIG. 2 is a graph showing the relationship between temperature and sulfur conversion according to different equations.

Sub-dew point unit 200 employs sub-dew point technology to take advantage of the Gamson-Elkins relationship that indicates improvement in Reaction (2), the Claus reaction, under colder operating temperatures. FIG. 2 shows the Gamson-Elkins relationship. Unlike the conventional Claus catalytic reactors that are operated at temperatures above the sulfur dew point to avoid deactivation of the catalyst, sub-dew point reactors are operated at temperatures below the sulfur dew point. The reactors in sub-dew point unit 200 are continuously cycled between a regeneration mode and an adsorption mode. While one sub-dew point reactor regenerates in the regeneration mode, the other two sub-dew point reactors continue to operate in series and support the Claus reaction resulting in a cumulative recovery efficiency of greater than 99.9 percent (99.9+%). During the adsorption mode, operating at temperatures below the dew point of sulfur allows the sulfur vapor produced in the sub-dew point reactor to liquefy and become trapped in the pores of the catalyst of a catalyst bed. The dew point temperature of sulfur depends on the partial pressure of sulfur in the sub-dew point reactors. Once the catalyst bed in the third position has accumulated approximately ⅓ of the weight of the catalyst bed in the form of liquid sulfur, the reactor can be cycled into the regeneration mode. The cycling reactor in the first position then becomes the cycling reactor in the second position and the cycling reactor in the second position becomes the cycling reactor in the third position. The regeneration mode includes a heating step, a re-vaporization step, and a cooling step. During the heating step and the re-vaporization step of the regeneration mode, the liquid sulfur is boiled off and recovered in a condenser.

Referring to FIGS. 1A and 1B, an embodiment of sub-dew point unit 200 is described. The description provides one flow path through sub-dew point unit 200 and, due to the cycling nature of the process, it is understood that each of the sub-dew point reactors are operated in the regeneration mode and the adsorption mode and the position of each sub-dew point reactor depends on the process run time and overall recovery efficiency of sulfur. As used throughout, references to position are relative position in the process and not physical position or arrangement of the reactors. Thicker lines are used to indicate the flow path described, thinner lines denote the flow path when the reactors are in alternate cycles.

The embodiment of sub-dew point unit 200 shown in FIGS. 1A and 1B includes three sub-dew point reactors: first reactor 210 in the first position, second reactor 220 in the second position, and third reactor 230 in the third position. Each reactor of first reactor 210, second reactor 220, and third reactor 230 contains an alumina catalyst in the catalyst bed.

Figure 3:
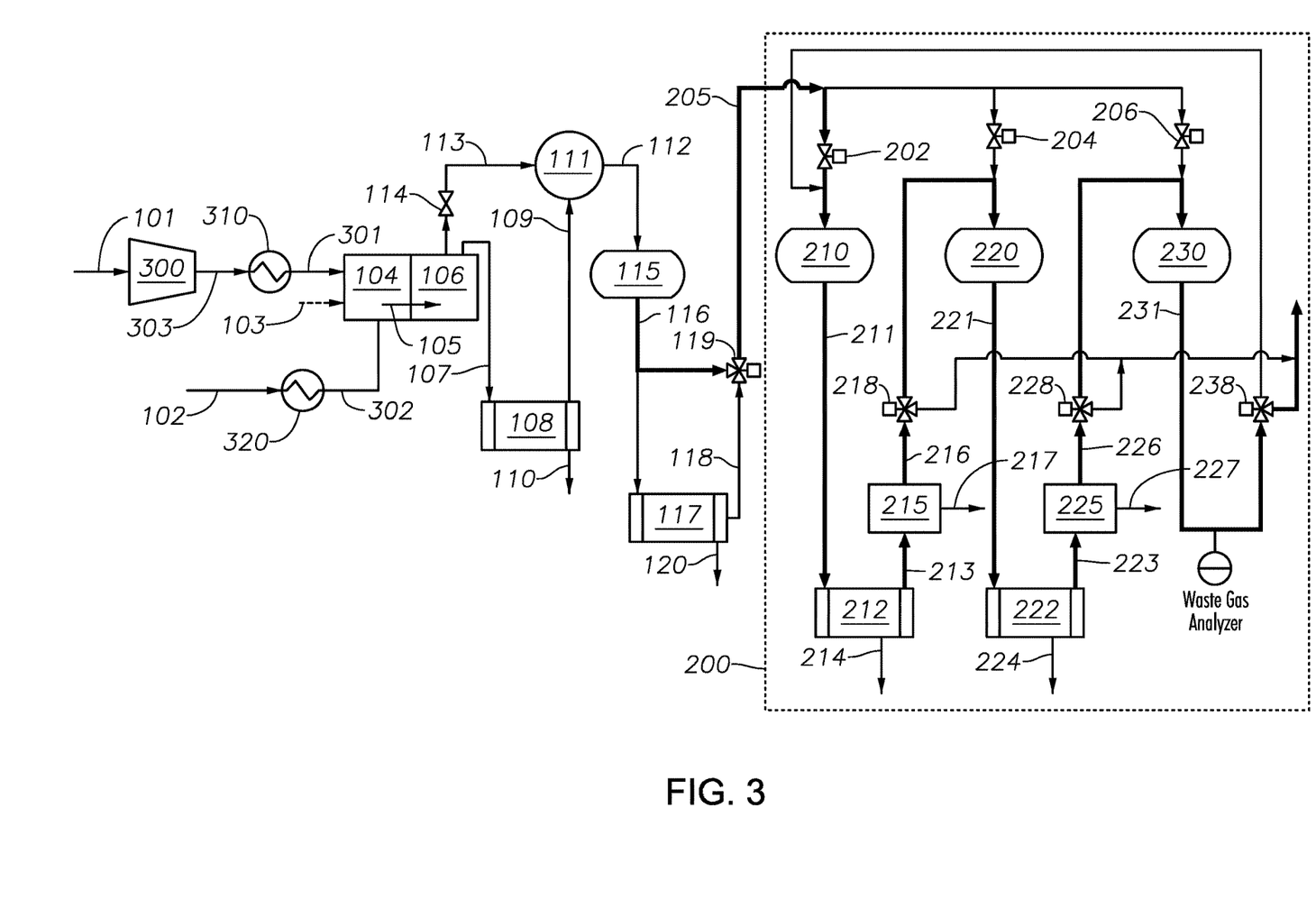
FIG. 3 is a diagrammatic representation of the sulfur recovery system including the membrane units, according to an embodiment.

Each cycling reactor is associated with a reactor condenser and a separation unit. Sub-dew point unit 200 includes switching valves upstream of each cycling reactor and bypass valves downstream of each separation unit. In at least one embodiment, as shown in FIG. 3, the switching valves and bypass valves are configured such that the system includes three sub-dew point cycling reactors and two reactor condensers and two separation units, such that the two condensers and separation units are shared by the three sub-dew point cycling reactors. In the configuration with three sub-dew point cycling reactors, two reactor condensers, and two separation units, the switching valves and bypass valves are configured such that one reactor condenser and one separation unit is operating in series with the sub-dew point cycling reactor in the regeneration mode, while the other reactor condenser and other separation unit is operating in series with the sub-dew point cycling reactor in the second position. The switching valves and bypass valves can be programmed to operate on set time intervals to routing the fluid streams to the correct condenser and separation unit.

The reactor condensers can be any type of heat exchanger capable of condensing elemental sulfur from a vapor phase to a liquid phase and can be designed to reach a temperature such that most sulfur in the stream is condensed. In at least one embodiment, each reactor condenser is a shell-and-tube heat exchanger.

The separation units can be any separation unit designed to remove water from a wet product stream. "Wet product stream" as used herein, refers to a stream containing water vapor. Separation units suitable for use as the separation unit include molecular separation devices, membrane separators, nanofiltration units, and combinations of the same. Molecular separation devices are capable of selectively removing water vapor from a wet product stream while rejecting the remaining components in the gas phase due to differences in physical properties and interactions. Membrane separators include membranes and are capable of selectively removing water from a stream containing elemental sulfur due to the size difference between water vapor and sulfur vapor. In at least one embodiment, the membranes suitable for use in the membrane separators can have an adsorption affinity towards water and exclude sulfur. In at least one embodiment, a channel diameter of a membrane can be designed such that it excludes water, while allowing sulfur to pass through. The membranes suitable for use in membrane separators can be manufactured from one or more of a natural polymer, a synthetic polymer, ceramic components, and metallic membranes. Membranes can be manufactured as flat sheet stock or as hollow fibers and then organized into several different types of membrane modules. Advantageously, the inclusion of the separation units can maximize the production of sulfur in the subsequent reactors. The system and method to recover sulfur from an acid gas stream is in the absence of a condenser that is designed to condense water vapor from a gas stream. The use of the separation units advantageously removes water to less than 5 wt % water, alternately less than 1 wt % and alternately the ppm level. The units suitable for use as the separation unit can continue to adsorb water vapor and thus remove water continuously.

The switching valves and the bypass valves facilitate cycling within sub-dew point unit 200. Each bypass valve can be a three-way specialized fully steam-jacketed valve. The switching valves and bypass valves that separate the reactors and the reactor condensers can allow the sub-dew reactors to cycle as the adsorption and regeneration of the catalysts in the sub-dew point reactors occurs as a batch process.

First reactor 210 starts in the regeneration mode. During the heating step and the re-vaporization step of the regeneration mode, catalytic unit condenser 117 is completely or partially bypassed and catalytic outlet stream 116 is routed through cycling valve 119 to produce unit feed stream 205. An amount in the range of 10 volume percent (vol %) and 20 vol % of catalytic outlet stream 116 can continue to flow through catalytic unit condenser 117 such that tail gas analyzer 10 positioned on cooled catalytic outlet 118 can acquire information and to avoid thermal shock of condenser 117. Tail gas analyzer 10 can be any type of instrument capable of analyzing the composition of a fluid stream. The temperature of catalytic outlet stream 116 is sufficient to increase the temperature in first reactor 210 to greater than the dew point of sulfur and overcome the heat of vaporization. Cycling valve 119 is a specialized fully steam-jacketed valve. Catalytic outlet stream 116 bypasses catalytic unit condenser 117.

During the heating step, the temperature of catalytic outlet stream 116 increases the temperature in first reactor 210 to greater than the vaporization temperature of sulfur. During the re-vaporization step, the temperature of catalytic outlet stream 116 is maintained at greater than the vaporization temperature of sulfur such that the liquid sulfur in first reactor 210 is vaporized and flows from the pores in the catalyst and exits first reactor 210 as first reactor outlet 211.

First reactor outlet 211 is introduced to first reactor condenser 212. The temperature of first reactor outlet 211 can be reduced in first reactor condenser 212 to produce first cooled reactor outlet 213. The temperature of first cooled reactor outlet 213 can be between 120° C. and 200° C., 120°

C. and 175° C., and alternately between 150° C. and 175° C. Sulfur present in first reactor outlet 211 can condense in first reactor condenser 212 and be removed from the process in first sulfur product 214. First cooled reactor outlet 213 can contain $H_2S$, $SO_2$, water vapor, sulfur-containing contaminants, and combinations of the same. First cooled reactor outlet 213 is introduced to first separation unit 215.

First separation unit 215 is downstream of and fluidly connected to first reactor condenser 212. First separation unit 215 can remove water vapor from first cooled reactor outlet 213 to produce first dehydrated stream 216 and first water stream 217.

First separation unit 215 can remove between about 40 vol % to 100 vol % of the water vapor from first cooled reactor outlet 213 and alternately between about 50 vol % and 75 vol %. The temperature in first separation unit 215 can be between 120° C. and 170° C., alternately between 120° C. and 160° C., alternately between 120° C. and 150° C., and alternately between 120° C. and 140° C. In at least one embodiment, the temperature of first separation unit 215 is between 120° C. and 150° C. First water stream 217 can contain water in the vapor phase or in the liquid phase. First water stream 217 contains greater than 99% water and less than 1% impurities, including less than 1% sulfur. First water stream 217 can be disposed of, treated and reused, or recycled to other parts of the process. In at least one embodiment, the water can be maintained in the vapor phase and introduced to the thermal oxidizer for release to the atmosphere.

First dehydrated stream 216 can be introduced to second reactor 220 through first bypass valve 218. Second reactor 220 is at sub-dew point temperatures in the range between 125° C. and 230° C. and Claus reactions occur to convert hydrogen sulfide to sulfur. The reaction products exit second reactor 220 in second reactor outlet 221.

Second reactor outlet 221 is introduced to second reactor condenser 222. The temperature of second reactor outlet 221 can be reduced in second reactor condenser 222 to produce second cooled reactor outlet 223. The temperature of second cooled reactor outlet 223 can be between 120° C. and 200° C., alternately between 120° C. and 175° C., and alternately between 150° C. and 175° C. Sulfur present in second reactor outlet 221 can condense in second reactor condenser 222 and be removed from the process in second sulfur product 224. Second cooled reactor outlet 223 can contain $H_2S$, $SO_2$, water vapor, sulfur-containing contaminants, and combinations of the same. Second cooled reactor outlet 223 is introduced to second separation unit 225.

Second separation unit 225 is downstream of and fluidly connected to second reactor condenser 222. Second separation unit 225 can remove water vapor from second cooled reactor outlet 223 to produce second dehydrated stream 226 and second water stream 227.

Second separation unit 225 can remove between about 40 vol % to 100 vol % of the water vapor from second cooled reactor outlet 223 and alternately between about 50 vol % and 75 vol %. The temperature in second separation unit 225 can be between 120° C. and 170° C., alternately between 120° C. and 160° C., alternately between 120° C. and 150° C., and alternately between 120° C. and 140° C. In at least one embodiment, the temperature of second separation unit 225 is between 120° C. and 150° C. Second water stream 227 can contain water in the vapor phase or in the liquid phase. Second water stream 227 contains greater than 99% water and less than 1% impurities. Second water stream 227 can be disposed of, treated and reused, or recycled to other parts of the process. In at least one embodiment, the water can be maintained in the vapor phase and introduced to the thermal oxidizer for release to the atmosphere.

Second dehydrated stream 226 can be introduced to third reactor 230 through second bypass valve 228. Third reactor 230 is at a sub-dew point temperature between 120° C. and 150° C. and Claus reactions occur to convert hydrogen sulfide to sulfur. The reaction products exit third reactor 230 in third reactor outlet 231.

Third reactor outlet 231 is introduced to third reactor condenser 232. The temperature of third reactor outlet 231 can be reduced in third reactor condenser 232 to produce third cooled reactor outlet 233. The temperature of third cooled reactor outlet 233 can be between 120° C. and 200° C., 120° C. and 175° C., and alternately between 150° C. and 175° C. Sulfur present in third reactor outlet 231 can condense in third reactor condenser 232 and be removed from the process in third sulfur product 234. Third cooled reactor outlet 233 can contain $H_2S$, $SO_2$, water vapor, sulfur-containing contaminants, and combinations of the same. Third cooled reactor outlet 233 is introduced to third separation unit 235.

Third separation unit 235 is downstream of and fluidly connected to third reactor condenser 232. Third separation unit 235 can remove water vapor from third cooled reactor outlet 233 to produce third dehydrated stream 236 and third water stream 237.

Third separation unit 235 can remove between about 40 vol % to 100 vol % of the water vapor from third cooled reactor outlet 233 and alternately between about 50 vol % and 75 vol %. The temperature in third separation unit 235 can be between 120° C. and 170° C., alternately between 120° C. and 160° C., alternately between 120° C. and 150° C., and alternately between 120° C. and 140° C. In at least one embodiment, the temperature of third separation unit 235 is between 120° C. and 150° C. Third water stream 237 can contain water in the vapor phase or in the liquid phase. Third water stream 237 contains greater than 99% water and less than 1% impurities. Third water stream 237 can be disposed of, treated and reused, or recycled to other parts of the process. In at least one embodiment, the water can be maintained in the vapor phase and introduced to the thermal oxidizer for release to the atmosphere.

Third dehydrated stream 236 can be sent to a thermal oxidizer for treatment for release to the atmosphere. Third dehydrated stream 236 can pass through third bypass valve 238. Third dehydrated stream 236 can contain small amounts of $H_2S$ and $SO_2$ and negligible amounts of sulfur vapor and sulfur-containing contaminants. In the thermal oxidizer, the $H_2S$, sulfur vapor and sulfur-containing contaminants can be combusted to $SO_2$ in the presence of excess oxygen. The effluent from the thermal oxidizer includes only $CO_2$, $H_2O$, $SO_2$, $N_2$, Ar and various negligible trace components.

One of skill in the art will appreciate that the cycling reactor in the second position and in the third position, second cycling reactor 220 and third cycling reactor 230 in the embodiment of FIG. 1A, are in the adsorption mode while the cycling reactor in the first position is in the regeneration mode.

The re-vaporization step of the regeneration mode in first cycling reactor 210 continues for a re-vaporization time. The re-vaporization time is the amount of time for first reactor 210 to be in the re-vaporization step of the regeneration mode and can be based on the flow rate and operational efficiency of the sub-dew point reactors. Flow rate analyzer 20 is included on first sulfur product 214 to measure the flow rate. Flow rate analyzer 20 can be any type of analyzer capable of measuring the flow rate of a fluid stream. The flow rate data collected by flow rate analyzer 20 can be used to adjust the re-vaporization time. In alternate embodiment, the re-vaporization step continues until flow rate of first sulfur product 214 reaches a minimum value, as measured by flow rate analyzer 20, which indicates sulfur in first reactor 210 is removed. At the end of the re-vaporization time, the cooling step is initiated.

The cooling step can be understood with reference to FIG. 1B. The cooling step is initiated by closing cycling valve 119 such that catalytic outlet stream 116 flows into catalytic unit condenser 117. Catalytic unit condenser 117 can be any type of heat exchanger capable of condensing elemental sulfur from a vapor phase to a liquid phase and can be designed to reach a temperature such that all sulfur in the catalytic outlet stream 116 is condensed. In at least one embodiment, catalytic unit condenser 117 is a shell-and-tube heat exchanger. The temperature of catalytic outlet stream 116 can be reduced in catalytic condenser unit 117 to produce cooled catalytic outlet 118. The temperature of cooled catalytic outlet 118 can be between 120° C. and 200° C., alternately between 120° C. and 175° C. and alternately between 150° C. and 175° C. Sulfur present in catalytic outlet stream 116 can condense in catalytic unit condenser 117 and be removed from the process in liquid sulfur 120.

During the cooling step, cooled catalytic outlet 118 flows through bypass valve 119 as unit feed stream 205. In the embodiment shown with reference to FIGS. 1A and 1B, unit feed stream 205 is introduced to first reactor 210 via switching valve 202. The temperature of unit feed stream 205 during the cooling step can reduce the temperature of first reactor 210 in preparation for being cycled to the second position. One of skill in the art will appreciate that the temperature and composition of unit feed stream 205 can change depending on whether any of the reactors in sub-dew point unit 200 is operating in the cooling step or whether they are operating in the heating step, re-vaporization step or adsorption mode.

The temperature in each cycling reactor and the temperature in the reactor outlet of each cycling reactor depends on the mode in which the cycling reactor is operating and the position relative to the other cycling reactors. The reactor outlet of the cycling reactor in the first position can be at a temperature between 180° C. and 360° C. depending on the step of the regeneration mode. The temperature of the reactor outlet of the cycling reactor in the second position can be between 130° C. and 190° C., and the temperature of the reactor outlet of the cycling reactor in the third position can be between 120° C. and 130° C.

The cycling reactor in the second position remains in the sub-dew point temperature zone for almost the entirety of the duration it is in the adsorption mode in the second position. There is a period of time, on the order of minutes, immediately after switching from the first position to the second position during which the temperature in the cycling reactor in the second position can be greater than the dew point temperature of sulfur. Advantageously, the presence of the cycling reactor in the third position, which remains at less than sub-dew point temperatures for the entirety of its time in the third position, enables the overall sulfur recovery efficiency to be greater than 99.9%. The use of three reactors in sub-dew point unit 200 can eliminate the need for a tail gas treatment unit.

Advantageously, the use of the sub-dew point unit can address the amount of sulfur vapor in the process stream exiting a condenser, due to saturation at equilibrium. The sub-dew point reactors can trap the sulfur vapor, suppressing saturation and increasing the amount of sulfur recovered.

In certain embodiments, an $SO_2$ scrubbing unit can be included (not shown). The $SO_2$ scrubbing unit can process the thermal oxidizer flue gas (not shown). The inclusion of the $SO_2$ scrubbing unit can achieve a 100% sulfur recovery efficiency. Various commercialized flue gas desulfurization technologies can be implemented to remove the remaining $SO_2$ from the process gas stream.

The Claus process requires a stoichiometric ratio of $H_2S:SO_2$ of 2:1 for optimal conversion. Tail gas analyzer 10 installed at the outlet of catalytic unit condenser 117 for measuring the composition of cooled catalytic outlet 118 can be used to control the flow rate of combustion air 102 that is supplied as a feed to the reaction furnace.

In at least one embodiment, additional analyzer 50 can be included on the line to the thermal oxidizer (TOX). Additional analyzer 50 can be any type of instrument capable of analyzing the composition of a fluid stream and should not be limited to hydrogen sulfide, sulfur dioxide, carbonyl sulfide, and carbon disulfide. Additional analyzer 50 can be the same type of instrument used for tail gas analyzer 10. The data collected by additional analyzer 50 can be used for ultra-fine-tuning and can supplement the feedback signal from tail gas analyzer 10.

This configuration can improve the overall sulfur recovery efficiency and also minimize the emissions spike that can occur during the switching sequence of the reactors, such that the reactor next in sequence for adsorption position is flushed to the thermal oxidizer. Methods and systems disclosed here can also result in reductions in the capital expenses and the operating expenses as compared to a two-stage Claus plant with reduction absorption amine-based TGT.

The cycles in sub-dew point unit 200 are shown in Table 1.

TABLE 1

| | | | Sequence of Steps in each Cycle | | |
|---|---|---|---|---|---|
| Cycle | Position | Sub-dew point reactor | Stage | Step | Catalytic unit condenser 117 |
| 1 | 1 | 210 | Regeneration | Heating & Re-vaporization Cooling | Bypassed On-Stream |
|   | 2 | 220 | Adsorption | Cooling & Adsorption | |
|   | 3 | 230 | Adsorption | Adsorption | |
| 2 | 1 | 230 | Regeneration | Heating & Re-vaporization Cooling | Bypassed On-Stream |
|   | 2 | 210 | Adsorption | Cooling & Adsorption | |
|   | 3 | 220 | Adsorption | Adsorption | |

TABLE 1-continued

Sequence of Steps in each Cycle

| Cycle | Position | Sub-dew point reactor | Stage | Step | Catalytic unit condenser 117 |
|---|---|---|---|---|---|
| 3 | 1 | 220 | Regeneration | Heating & Re-vaporization Cooling | Bypassed On-Stream |
|   | 2 | 230 | Adsorption | Cooling & Adsorption |   |
|   | 3 | 210 | Adsorption | Adsorption |   |
| 4 | 1 | 210 | Regeneration | Heating & Re-vaporization Cooling | Bypassed On-Stream |
|   | 2 | 220 | Adsorption | Cooling & Adsorption |   |
|   | 3 | 230 | Adsorption | Adsorption |   |

The cycles continue to repeat as required by the manufacturing process.

The following example is provided to illustrate an embodiment of the methods and systems disclosed here.

Example

The following process was simulated based on a simulation of a configuration of FIG. 3, which includes one Claus catalytic reactor and three sub-dew point reactors using Sulsim™ Sulfur Recovery in Aspen HYSYS® software. The data suggest that sulfur vapor in third reactor outlet 231 is in equilibrium, however, in actual practice, all or almost all of the sulfur vapor in third reactor outlet 231 remains trapped in third reactor 230 due to suppressed saturation. Therefore, the sulfur vapor in the outlet stream from the final sub-dew point reactor must be removed from the HMB.

Case 1. Case 1 simulates a scenario where reactor 210 is in the heating step and re-vaporization step of the regeneration mode and reactors 220 and 230 are in the adsorption mode. A water removal efficiency of 75% was used for first separation unit 215 and second separation unit 225.

Acid gas stream 101, at a flow rate of 508,217 lbmole/hr, is introduced to saturator 300 to produce wet acid gas stream 303, which is then supplied to acid gas preheater 310. Saturator 300 was used in the simulator to simulate the acid coming from the upstream amine unit, such as an amine regenerator overhead is saturated with water. The temperature of wet acid gas stream 303 is increased in acid gas preheater 310 to produce hot acid gas stream 301. Hot acid gas stream 301 includes 0.4018 mole frac carbon dioxide, 0.5211 mole frac hydrogen sulfide, 0.0743 mole frac water, 0.0028 mole frac hydrocarbons, and less than 0.0001 mole frac sulfur-containing contaminants. Hot acid gas stream 301 is at a temperature of 460° F. (237.8° C.).

Combustion air 102 includes air. The temperature of combustion air 102 is increased in air preheater 320 to produce hot combustion air 302 at a temperature of 460° F. (237.8° C.).

Hot acid gas stream 301 along with a hot combustion air 302 is supplied to reaction furnace 104. Reaction product 105, containing elemental sulfur, hydrogen sulfide, sulfur dioxide, and water vapor, is supplied to waste heat boiler (WHB) 106 to produce boiler outlet 107. Boiler valve 114 is open to allow hot feed 113 to exit waste heat boiler 106 and be introduced to reheater 111. Boiler outlet 107 is supplied to furnace condenser 108. The temperature of cooled outlet 109 from furnace condenser 108 is increased in reheater 111, which was simulated as a hot bypass reheater. Hot stream 112 is introduced to Claus catalytic unit 115. Properties of the streams between reaction furnace 104 and Claus catalytic unit 115 are shown in Table 2.

TABLE 2

Stream Properties

| Property | Reaction Product 105 | Boiler Outlet 107 | Cooled Outlet 109 | Hot feed 113 | Hot Stream 112 |
|---|---|---|---|---|---|
| Pressure (psig) | 9 | 7.5 | 6.5 | 8.0 | 6.5 |
| Temperature (F) | 1985 | 572 | 310 | 1000 | 508 |
| Mass Flow (lbmole/hr) | 1,214,594 | 916,200 | 898,110 | 243,700 | 1,135,556 |
| Component (mole frac) | | | | | |
| Hydrogen | 0.0189 | 0.0184 | 0.0188 | 0.0180 | 0.0187 |
| Argon | 0.0049 | 0.0052 | 0.0053 | 0.0050 | 0.0052 |
| Oxygen | 0.0000 | 0.0000 | 0.0000 | 0.0000 | 0.00 |
| Nitrogen | 0.4116 | 0.4334 | 0.4421 | 0.4223 | 0.4403 |
| Carbon Monoxide | 0.0076 | 0.0061 | 0.0062 | 0.0059 | 0.0062 |
| Carbon Dioxide | 0.1667 | 0.1755 | 0.1790 | 0.1709 | 0.1783 |
| Hydrogen Sulfide | 0.0457 | 0.0496 | 0.0505 | 0.0483 | 0.0503 |
| Sulfur Dioxide | 0.0333 | 0.0350 | 00358 | 0.0341 | 0.0356 |
| Water | 0.2322 | 0.2445 | 0.2494 | 0.2382 | 0.2484 |
| Sulfur-containing Contaminants | 0.0101 | 0.0125 | 0.0127 | 0.0122 | 0.0127 |
| Sulfur (vapor) | 0.0691 | 0.0199 | 0.0002 | 0.0451 | 0.0043 |
| Sulfur (liquid) | 0.0000 | 0.0000 | 0.0000 | 0.0000 | 0.0000 |

In Claus catalytic unit 115 about 70% of the $H_2S$ and $SO_2$ in hot stream 112 reacts to form sulfur and to produce catalytic outlet stream 116. Because reactor 210 is in the heating step and re-vaporization step of the regeneration mode, catalytic unit condenser 117 is bypassed and catalytic outlet stream 116 is introduced directly to sub-dew point unit 200. Reactors 220 and 230 are in the adsorption mode. Third reactor outlet 231 is fed directly to the thermal oxidizer. The simulation is not set up to model the dynamic behavior during the regeneration mode and as a result, first cooled reactor outlet 213 represents the end of regeneration, that is the point when all sulfur is boiled off and Claus catalytic unit 115 and first reactor 210 are at the same temperature having the same properties and components, before the cooling of first reactor 210 with closing cycling valve 119 and reducing the temperature of catalytic outlet stream 116 in catalytic unit condenser 117. The properties of catalytic outlet stream 116 and the streams in sub-dew point unit 200 are shown in Table 3.

TABLE 3

Stream properties in sub-dew point unit 200

| Property | Catalytic Outlet Stream 116 | First reactor outlet 211 | First cooled reactor outlet 213 | First sulfur product 214 | First dehydrated stream 216 | First water stream 217 |
|---|---|---|---|---|---|---|
| Pressure (psig) | 5.5 | 4.5 | 3.5 | 3.5 | 3.5 | 3.5 |
| Temperature (F) | 650 | 650 | 255 | 255 | 255 | 225 |
| Molar Flow (lbmole/hr) | 1,120,930 | 1,121,003 | 1,104,116 | 114,675 | 870,612 | 233,504 |
| Component (mole frac) | | | | | | |
| Hydrogen | 0.0190 | 0.0190 | 0.0193 | 0.0000 | 0.0244 | 0.0000 |
| Argon | 0.0053 | 0.0053 | 0.0054 | 0.0000 | 0.0068 | 0.0000 |
| Oxygen | 0.0000 | 0.0000 | 0.0000 | 0.0000 | 0.0000 | 0.0000 |
| Nitrogen | 0.4460 | 0.4460 | 0.4528 | 0.0000 | 0.5743 | 0.0000 |
| Carbon Monoxide | 0.0063 | 0.0063 | 0.0064 | 0.0000 | 0.0081 | 0.0000 |
| Carbon Dioxide | 0.1934 | 0.1933 | 0.1963 | 0.0000 | 0.2489 | 0.0000 |
| Hydrogen Sulfide | 0.0247 | 0.0248 | 0.0252 | 0.0002 | 0.0319 | 0.0000 |
| Sulfur Dioxide | 0.0123 | 0.0124 | 0.0126 | 0.0000 | 0.0160 | 0.0000 |
| Water | 0.2779 | 0.2777 | 0.2820 | 0.0000 | 0.0894 | 1.0000 |
| Sulfur-containing Contaminants | 0.0001 | 0.0001 | 0.0001 | 0.0000 | 0.0001 | 0.0000 |
| Sulfur (vapor) | 0.0151 | 0.0151 | 0.0000 | 0.0000 | 0.0001 | 0.0000 |
| Sulfur (liquid) | 0.0000 | 0.0000 | 0.0000 | 0.9998 | 0.0000 | 0.0000 |

| Property | Second reactor outlet 221 | Second cooled reactor outlet 223 | Second sulfur reactor outlet 224 | Second dehydrated stream 226 | Second water stream 227 | Third reactor outlet 231 |
|---|---|---|---|---|---|---|
| Pressure (psig) | 2.5 | 0.5 | 0.5 | 0.3 | 0.3 | 0.1 |
| Temperature (F) | 361 | 255 | 255 | 255 | 255 | 259 |
| Mass Flow (lbmole/hr) | 891,420 | 857,173 | 40,334 | 778,540 | 78,632 | 779,088 |
| Component (mole frac) | | | | | | |
| Hydrogen | 0.0239 | 0.0248 | 0.0000 | 0.0273 | 0.0000 | 0.0273 |
| Argon | 0.0067 | 0.0069 | 0.0000 | 0.0076 | 0.0000 | 0.0076 |
| Oxygen | 0.0000 | 0.0000 | 0.0000 | 0.0000 | 0.0000 | 0.0000 |
| Nitrogen | 0.5609 | 0.5833 | 0.0000 | 0.6422 | 0.0000 | 0.6418 |
| Carbon Monoxide | 0.0079 | 0.0082 | 0.0000 | 0.0090 | 0.0000 | 0.0090 |
| Carbon Dioxide | 0.2431 | 0.2529 | 0.0000 | 0.2784 | 0.0000 | 0.2782 |
| Hydrogen Sulfide | 0.0010 | 0.0011 | 0.0000 | 0.0012 | 0.0000 | 0.0001 |
| Sulfur Dioxide | 0.0005 | 0.0005 | 0.0000 | 0.0006 | 0.0000 | 0.0000 |
| Water | 0.1175 | 0.1221 | 0.0000 | 0.0336 | 0.9986 | 0.0347 |
| Sulfur-containing Contaminants | 0.0001 | 0.0001 | 0.0000 | 0.0000 | 0.0008 | 0.0000 |
| Sulfur (vapor) | 0.0011 | 0.0001 | 0.0000 | 0.0000 | 0.0006 | 0.0001 |
| Sulfur (liquid) | 0.0374 | 0.0000 | 1.0000 | 0.0000 | 0.0000 | 0.0012 |

The overall sulfur recovery efficiency of case 1 was 99.92%.

Case 2. Case 2 simulates a scenario where reactor 210 is in the cooling step of the regeneration mode and reactors 220 and 230 are in the adsorption mode. A water removal efficiency of 75% was used for first separation unit 215 and second separation unit 225.

Acid gas stream 101, at a flow rate of 508,217 lbmole/hr, is introduced to saturator 300 to produce wet acid gas stream 303, which is then supplied to acid gas preheater 310. The temperature of wet acid gas stream 303 is increased in acid gas preheater 310 to produce hot acid gas stream 301. Hot acid gas stream 301 includes 0.4018 mole frac hydrogen sulfide, 0.5211 mole frac carbon dioxide, 0.0743 mole frac water, 0.0028 mole frac hydrocarbons, and less than 0.0001 mole frac sulfur-containing contaminants. Hot acid gas stream 301 is at a temperature of 460° F. (237.8° C.).

Combustion air 102 includes air. The temperature of combustion air 102 is increased in air preheater 320 to product hot combustion air 302 at a temperature of 460° F. (237.8° C.).

Hot acid gas stream 301 along with a hot combustion air 302 is supplied to reaction furnace 104. Reaction product 105, containing elemental sulfur, hydrogen sulfide, sulfur dioxide, and water vapor, is supplied to waste heat boiler (WHB) 105 to produce boiler outlet 107. Boiler valve 114 is open to allow hot feed 113 to exit waste heat boiler 106 and be introduced to reheater 111. Boiler outlet 107 is supplied to furnace condenser 108. The temperature of cooled outlet 109 from furnace condenser 108 is increased in reheater 111, which was simulated as a hot bypass reheater. Hot stream 112 is introduced to Claus catalytic unit 115. Properties of the streams between reaction furnace 104 and Claus catalytic unit 115 are shown in Table 4. As can be seen, the same properties and compositions were used as in case 1.

TABLE 4

| Property | Stream Properties | | | | |
|---|---|---|---|---|---|
| | Reaction Product 105 | Boiler Outlet 107 | Cooled Outlet 109 | Hot feed 113 | Hot Stream 112 |
| Pressure (psig) | 9 | 7.5 | 6.5 | 8.0 | 6.5 |
| Temperature (F) | 1985 | 572 | 310 | 1000 | 508 |
| Mass Flow (lbmole/hr) | 1,214,594 | 916,200 | 898,110 | 243,700 | 1,135,556 |
| Component (mole frac) | | | | | |
| Hydrogen | 0.0189 | 0.0184 | 0.0188 | 0.0180 | 0.0187 |
| Argon | 0.0049 | 0.0052 | 0.0053 | 0.0050 | 0.0052 |
| Oxygen | 0.0000 | 0.0000 | 0.0000 | 0.0000 | 0.00 |
| Nitrogen | 0.4117 | 0.4334 | 0.4422 | 0.4223 | 0.4403 |
| Carbon Monoxide | 0.0076 | 0.0061 | 0.0062 | 0.0059 | 0.0062 |
| Carbon Dioxide | 0.1666 | 0.1754 | 0.1790 | 0.1709 | 0.1782 |
| Hydrogen Sulfide | 0.0457 | 0.0495 | 0.0505 | 0.0483 | 0.0503 |
| Sulfur Dioxide | 0.0333 | 0.0351 | 00358 | 0.0342 | 0.0356 |
| Water | 0.2322 | 0.2445 | 0.2494 | 0.2382 | 0.2484 |
| Sulfur-containing Contaminants | 0.0101 | 0.0125 | 0.0127 | 0.0122 | 0.0127 |
| Sulfur (vapor) | 0.0691 | 0.0199 | 0.0002 | 0.0451 | 0.0043 |
| Sulfur (liquid) | 0.0000 | 0.0000 | 0.0000 | 0.0000 | 0.0000 |

In Claus catalytic unit 115 about 70% of the $H_2S$ and $SO_2$ in hot stream 112 reacts to form sulfur and to produce catalytic outlet stream 116. Because reactor 210 is in the cooling step of the regeneration mode, catalytic outlet stream 116 is introduced to catalytic unit condenser 117. The temperature of catalytic outlet stream 116 is reduced in catalytic unit condenser 117 to produce cooled catalytic outlet 118, which is introduced to sub-dew point unit 200. Reactors 220 and 230 are in the adsorption mode. Third reactor outlet 231 is fed directly to the thermal oxidizer. The properties of streams in sub-dew point unit 200 are shown in Table 5.

TABLE 5

| Property | Stream properties in sub-dew point unit 200 | | | | | |
|---|---|---|---|---|---|---|
| | Catalytic outlet stream 116 | First reactor outlet 211 | First cooled reactor outlet 213 | First sulfur product 214 | First dehydrated stream 216 | First water stream 217 |
| Pressure (psig) | 5.5 | 3.5 | 2.5 | 2.5 | 2.5 | 2.5 |
| Temperature (F) | 650 | [Please provide the temperature in first reactor 211] | 255 | 255 | 255 | 225 |

TABLE 5-continued

Stream properties in sub-dew point unit 200

| | | | | | | |
|---|---|---|---|---|---|---|
| Mass Flow (lbmole/hr) | 1,121,072 | 1,121,003 | 1,104,116 | 114,675 | 870,612 | 233,504 |
| Component (mole frac) | | | | | | |
| Hydrogen | 0.0190 | 0.0190 | 0.0195 | 0.0000 | 0.0253 | 0.0000 |
| Argon | 0.0053 | 0.0053 | 0.0055 | 0.0000 | 0.0071 | 0.0000 |
| Oxygen | 0.0000 | 0.0000 | 0.0000 | 0.0000 | 0.0000 | 0.0000 |
| Nitrogen | 0.4461 | 0.4473 | 0.4581 | 0.0000 | 0.5956 | 0.0000 |
| Carbon Monoxide | 0.0063 | 0.0063 | 0.0064 | 0.0000 | 0.0084 | 0.0000 |
| Carbon Dioxide | 0.1933 | 0.1939 | 0.1986 | 0.0000 | 0.2582 | 0.0000 |
| Hydrogen Sulfide | 0.0246 | 0.0026 | 0.0026 | 0.0000 | 0.0034 | 0.0000 |
| Sulfur Dioxide | 0.0123 | 0.0013 | 0.0013 | 0.0000 | 0.0017 | 0.0000 |
| Water | 0.2779 | 0.3007 | 0.3080 | 0.0000 | 0.1001 | 1.0000 |
| Sulfur-containing Contaminants | 0.0001 | 0.0000 | 0.0000 | 0.0000 | 0.0000 | 0.0000 |
| Sulfur (vapor) | 0.0151 | 0.0018 | 0.0000 | 0.0000 | 0.0001 | 0.0000 |
| Sulfur (liquid) | 0.0000 | 0.0000 | 0.0000 | 0.9998 | 0.0000 | 0.0000 |

| Property | Second reactor outlet 221 | Second cooled reactor outlet 223 | Second sulfur reactor outlet 224 | Second dehydrated stream 226 | Second water stream 227 | Third reactor outlet 231 |
|---|---|---|---|---|---|---|
| Pressure (psig) | 1.5 | 0.5 | 0.5 | 0.3 | 0.3 | 0.1 |
| Temperature (F) | 361 | 255 | 255 | 255 | 255 | 259 |
| Mass Flow (lbmole/hr) | 891,420 | 857,173 | 40,334 | 778,540 | 78,632 | 779,088 |
| Component (mole frac) | | | | | | |
| Hydrogen | 0.0252 | 0.0254 | 0.0000 | 0.0275 | 0.0000 | 0.0275 |
| Argon | 0.0071 | 0.0071 | 0.0000 | 0.0077 | 0.0000 | 0.0077 |
| Oxygen | 0.0000 | 0.0000 | 0.0000 | 0.0000 | 0.0000 | 0.0000 |
| Nitrogen | 0.5938 | 0.5966 | 0.0000 | 0.6469 | 0.0000 | 0.6469 |
| Carbon Monoxide | 0.0084 | 0.0084 | 0.0000 | 0.0091 | 0.0000 | 0.0091 |
| Carbon Dioxide | 0.2574 | 0.2587 | 0.0000 | 0.2804 | 0.0000 | 0.2804 |
| Hydrogen Sulfide | 0.0002 | 0.0002 | 0.0000 | 0.0002 | 0.0000 | 0.0001 |
| Sulfur Dioxide | 0.0001 | 0.0001 | 0.0000 | 0.0001 | 0.0000 | 0.0000 |
| Water | 0.1030 | 0.1035 | 0.0000 | 0.0281 | 0.9993 | 0.0282 |
| Sulfur-containing Contaminants | 0.0000 | 0.0000 | 0.0000 | 0.0000 | 0.0000 | 0.0000 |
| Sulfur (vapor) | 0.0001 | 0.0001 | 0.0000 | 0.0000 | 0.0007 | 0.0000 |
| Sulfur (liquid) | 0.0047 | 0.0000 | 1.0000 | 0.0000 | 0.0000 | 0.0000 |

The overall sulfur recovery efficiency of case 2 was 99.94%.

The results show that during the use of three sub-dew point reactors results in overall sulfur recovery greater than 99.9% in the absence of a TGT.

This innovative configuration utilizes membrane separation technology to reduce the operating cost, the downstream processing, the equipment size, the capital cost, and energy consumption. The foregoing descriptions of methods, compositions, and results obtained using them are provided merely as illustrative examples. Descriptions of the methods are not intended to require or imply that the steps of the various embodiments must be performed in the order presented. As will be appreciated by one of ordinary skill in the art, the steps in the foregoing embodiments may be performed in any order. Words such as "then" are not intended to limit the order of the steps; these words are simply used to guide the reader through the description of the methods. Many of the operations may be performed in parallel or concurrently. In addition, the order of the operations may be re-arranged. Ranges may be expressed throughout as from about one particular value to about another particular value. When such a range is expressed, it is to be understood that another embodiment is from the one particular value to the other particular value, along with all combinations within said range. As used throughout, terms such as "first" and "second" are assigned based on the position of the unit in the flow path and are merely intended to differentiate between two or more of the same units in the system. It is to be understood that the words "first" and "second" serve no other purpose and are not part of the name or description of the component. Furthermore, it is to be understood that that the mere use of the term "first" and "second" does not require that there be any "third" component, although that possibility is contemplated under the scope.

Further modifications and alternative embodiments of various aspects of the compositions and methods disclosed here will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described here are to be taken as examples of embodiments. Elements and materials may be substituted for those illustrated and described here, parts and processes may be reversed or omitted, and certain features of the embodiments may be utilized independently, all as would be apparent to one skilled in the art after having the benefit of this description of the embodiments. Changes may be made in the elements described here without departing from the spirit and scope of the embodiments as described in the following claims.

What is claimed is:

1. A method to recover sulfur from an acid gas stream, the method comprising the steps of:
supplying the acid gas stream to a reaction furnace to produce a reaction product containing elemental sulfur, hydrogen sulfide, sulfur dioxide, and water vapor;
introducing the reaction product to a waste heat boiler to produce a boiler outlet, the waste heat boiler configured to reduce a temperature of the reaction product;
supplying the boiler outlet to a furnace condenser to produce a liquid sulfur stream and a cooled outlet;
introducing the cooled outlet to a reheater to produce a hot stream;
supplying the hot stream to a Claus catalytic unit to produce a catalytic outlet stream; and
cycling three reactors arranged in series between a first position, a second position, and a third position, wherein each reactor comprises a catalyst bed, wherein the catalyst bed comprises an alumina catalyst, wherein a cycling reactor in the first position operates in a regeneration mode, wherein the cycling reactors in the second position and the third position operate in an adsorption mode,
wherein the regeneration mode comprises a heating step, a re-vaporization step, and a cooling step,
the heating step comprises the steps of:
routing the catalytic outlet stream through a cycling valve to produce a unit feed stream, wherein the unit feed stream is at a temperature between 340° C. and 360° C.,
introducing the unit feed to the cycling reactor in the first position, wherein the cycling reactor in the first position comprises liquid sulfur in pores of the alumina catalyst,
increasing the temperature in the cycling reactor in the first position to greater than the dew point of sulfur,
the re-vaporization step comprises the steps of:
vaporizing the liquid sulfur in the cycling reactor in the first position to produce sulfur vapor,
collecting the sulfur vapor to produce a first reactor outlet,
reducing a temperature of the first reactor outlet in a reactor condenser to produce a first sulfur product and a cooled reactor outlet, wherein the temperature in the reactor condenser is less than the dew point of sulfur such that the first sulfur product comprises liquid sulfur,
separating water vapor from the first cooled reactor outlet in a first separation unit to produce a first water stream and a first dehydrated stream, wherein the first separation unit is selected from the group consisting of molecular separation devices, membrane separators, nanofiltration units, and combinations of the same, continuing the re-vaporization step for a re-vaporization time,
the cooling step comprises the steps of:
routing the catalytic outlet stream to a catalytic unit condenser after the re-vaporization time expires,
reducing a temperature of the catalytic outlet stream in the catalytic unit condenser to produce a liquid sulfur and cooled catalytic outlet, wherein the cooled catalytic outlet is at a temperature less than the dew point of sulfur, routing the cooled catalytic outlet through the cycling valve to produce the unit feed stream,
introducing the unit feed to the cycling reactor in the first position,
reducing the temperature in the cycling reactor in the first position to less than the dew point of sulfur,
wherein the adsorption mode comprises the steps of:
introducing the first dehydrated stream to the cycling reactor in the second position, wherein the second reactor is at a temperature between 130° C. and 190° C., operating the cycling reactor in the second position such that hydrogen sulfide and sulfur dioxide are converted to liquid sulfur such that the liquid sulfur fills pores in the alumina catalyst,
collecting unconverted gases in a second reactor outlet,
reducing a temperature of the second reactor outlet in a second reactor condenser to produce a second cooled reactor outlet,
separating water vapor from the second cooled reactor outlet in a second separation unit to produce a second water stream and a second dehydrated stream, wherein the second separation unit is selected from the group consisting of molecular separation devices, membrane separators, nanofiltration units, and combinations of the same, introducing the second dehydrated stream to the cycling reactor in the third position, operating the cycling reactor in the third position such that hydrogen sulfide and sulfur dioxide are converted to liquid sulfur such that the liquid sulfur fills the pores in the alumina catalyst,
collecting unconverted gases in a third reactor outlet,
reducing a temperature of the third reactor outlet in a third reactor condenser to produce a third cooled reactor outlet;
separating water vapor from the third cooled reactor outlet in a third separation unit to produce a third water stream and a third dehydrated stream, wherein the third separation unit is selected from the group consisting of molecular separation devices, membrane separators, nanofiltration units, and combinations of the same;
wherein the cycling reactor in the third position is cycled to the first position when an amount of liquid sulfur in the pores of the alumina catalyst is one-third of the weight of the alumina catalyst, such that the cycling reactor in the second position becomes the cycling reactor in the third position, and the cycling reactor in the first reactor becomes the cycling reactor in the second position,
wherein switching valves upstream of each reactor route the unit feed stream to the cycling reactor in the first position, wherein bypass valves downstream of each separation unit route the dehydrated stream to the subsequent reactor,
wherein removing water vapor from the cooled reactor outlets increases the conversion of hydrogen sulfide to sulfur.

2. The method of claim 1, wherein a temperature of the hot stream is between 200° C. and 380° C.

3. The method of claim 1, wherein the Claus catalytic unit comprises a catalyst, wherein the catalyst is selected from the group consisting of titanium dioxide, alumina, or combinations of the same.

4. The method of claim 1, wherein a temperature of the catalytic outlet stream is between 340° C. and 360° C.

5. The method of claim 1, wherein the amount of water vapor removed in each separation unit is between 40 vol % and 100 vol % of the water vapor present in each cooled reactor outlet.

6. The method of claim 1, wherein the temperature of the first reactor outlet is between 180° C. and 360° C., the temperature of the second reactor outlet is between 130° C. and 190° C., and the temperature of the third reactor outlet is between 120° C. and 130° C.

7. The method of claim 1, further comprising the step of introducing the third dehydrated stream to a thermal oxidizer.

8. The method of claim 1, wherein the overall sulfur recovery efficiency is greater than 99.9%.

9. The method of claim 1, further comprising the steps of introducing a hot feed from the waste heat boiler to the reheater, wherein the waste heat boiler is a two-pass waste heat boiler and the hot feed is from a first pass of the two-pass waste heat boiler; and mixing the hot feed and the cooled outlet in the reheater to produce the hot stream.

10. A system to recover sulfur from an acid gas stream, the system comprising:
a reaction furnace configured to produce a reaction product containing elemental sulfur, hydrogen sulfide, sulfur dioxide, and water vapor;
a waste heat boiler fluidly connected to the reaction furnace, the waste heat boiler configured to remove heat from the reaction product to produce a boiler outlet;
a furnace condenser fluidly connected to the waste heat boiler, the furnace condenser configured to process the boiler outlet to produce a liquid sulfur stream and a cooled outlet;
a reheater fluidly connected to the furnace condenser, the reheater configured to increase the temperature of the cooled outlet to produce a hot stream;
a Claus catalytic unit fluidly connected to the reheater, the Claus catalytic unit configured to process the hot stream to produce a catalytic outlet stream;
a catalytic unit condenser fluidly connected to the Claus catalytic unit, the catalytic unit condenser configured to reduce a temperature of the catalytic outlet stream to produce a cooled catalytic outlet;
a cycling valve fluidly connected to the Claus catalytic unit and the catalytic unit condenser, the cycling valve configured to bypass the catalytic unit condenser such that the catalytic outlet stream is routed directly to a sub-dew point unit as a unit feed stream; and
the sub-dew point unit fluidly connected to the cycling valve, the sub-dew point unit configured to recover sulfur, wherein the sub-dew point unit comprises:
three reactors arranged in series, each reactor comprising an alumina catalyst, each reactor configured to operate below the dew point of sulfur to produce liquid sulfur,
three sulfur condensers, each sulfur condenser fluidly connected to one reactor, each sulfur condenser configured to reduce a temperature of reactor outlet to produce a sulfur product and a cooled reactor outlet,
three separation units, each separation unit fluidly connected to one sulfur condenser, each separation unit is selected from the group consisting of molecular separation devices, membrane separators, nano-filtration units, and combinations of the same, each separation unit configured to remove water vapor from the cooled reactor outlet to produce a water stream and a dehydrated stream,
three switching valves, each switching valve fluidly connected to the cycling valve and to one reactor, the switching valves configured to route the unit feed stream to the reactor in a first position, and
three bypass valves, each bypass valve fluidly connected to one separation unit, the bypass valves configured to route each dehydrated stream to the subsequent reactor in series or to a thermal oxidizer.

11. The system of claim 10, wherein the Claus catalytic unit comprises a catalyst, wherein the catalyst is selected from the group consisting of titanium dioxide, alumina, or combinations of the same.

12. The system of claim 10, wherein the cycling valve is a specialized fully steam-jacketed valve.

13. The system of claim 10, wherein each bypass valve is a three-way specialized fully steam-jacketed valve.

14. The system of claim 10, wherein the separation unit is a membrane separator that comprises a membrane.

15. The system of claim 10, wherein a temperature of the hot stream is between 200° C. and 380° C.

16. The system of claim 10, wherein a temperature of the catalytic outlet stream is between 340° C. and 360° C.

17. The system of claim 10, wherein the amount of water vapor removed in each separation unit is between 40 vol % and 100 vol % of the water vapor present in each cooled reactor outlet.

18. The system of claim 10, wherein the temperature of the first reactor outlet is between 180° C. and 360° C., the temperature of the second reactor outlet is between 130° C. and 190° C., and the temperature of the third reactor outlet is between 120° C. and 130° C.

19. The system of claim 10, wherein the overall sulfur recovery efficiency is greater than 99.9%.

\* \* \* \* \*